(12) United States Patent
Owens et al.

(10) Patent No.: US 8,605,892 B1
(45) Date of Patent: Dec. 10, 2013

(54) DISPOSABLE ANTIMICROBIAL COVERING FOR DEVICE

(75) Inventors: Donald H. Owens, Williamsville, NY (US); Gary I. Weinberger, East Amherst, NY (US)

(73) Assignee: Bio-Med Disposable Covers, Inc., Lancaster, NY (US)

( * ) Notice: Subject to any disclaimer, the term of this patent is extended or adjusted under 35 U.S.C. 154(b) by 1353 days.

(21) Appl. No.: 10/725,731

(22) Filed: Dec. 2, 2003

(51) Int. Cl.
*H04M 1/00* (2006.01)

(52) U.S. Cl.
USPC .......................................... 379/452; 379/439

(58) Field of Classification Search
USPC .................................. 379/439, 452
See application file for complete search history.

(56) References Cited

U.S. PATENT DOCUMENTS

| | | | |
|---|---|---|---|
| 4,408,692 A | 10/1983 | Sigel et al. | |
| 4,484,367 A | 11/1984 | Jenkins | |
| 4,522,196 A | 6/1985 | Cunningham et al. | |
| 4,546,217 A * | 10/1985 | Frehn | 379/452 |
| 4,584,718 A | 4/1986 | Fuller | |
| 4,793,486 A | 12/1988 | Konopka et al. | |
| 4,819,265 A | 4/1989 | Colella | |
| 4,836,256 A | 6/1989 | Meliconi | |
| 4,901,852 A | 2/1990 | King | |
| 4,907,845 A | 3/1990 | Wood | |
| 4,939,778 A | 7/1990 | Tomberlin | |
| 4,953,567 A * | 9/1990 | Ward | 128/851 |
| 4,964,161 A * | 10/1990 | Trowbridge, Jr. | 379/452 |
| 5,054,063 A | 10/1991 | Lo et al. | |
| 5,092,459 A | 3/1992 | Uljanic et al. | |
| 5,175,897 A | 1/1993 | Marra, Jr. | |
| 5,301,657 A | 4/1994 | Lafferty et al. | |
| 5,323,802 A * | 6/1994 | Kiedrowski | 135/34.2 |
| 5,499,713 A | 3/1996 | Huffer | |
| 5,648,757 A | 7/1997 | Vernace et al. | |
| 5,792,045 A | 8/1998 | Adair | |
| 5,812,188 A | 9/1998 | Adair | |
| 5,873,456 A | 2/1999 | Hull et al. | |
| 5,944,432 A | 8/1999 | Richardson | |
| 5,971,916 A | 10/1999 | Koren | |
| 6,040,539 A | 3/2000 | Hiegel | |
| 6,068,119 A | 5/2000 | Derr et al. | |
| 6,082,535 A | 7/2000 | Mitchell | |
| 6,273,252 B1 | 8/2001 | Mitchell | |
| 6,321,751 B1 | 11/2001 | Strauss et al. | |
| 6,471,056 B1 | 10/2002 | Tzeng | |
| 6,560,335 B2 | 5/2003 | Zohn et al. | |
| 6,694,021 B1 * | 2/2004 | Julian | 379/452 |
| 2002/0067273 A1 | 6/2002 | Jaquest et al. | |
| 2002/0186123 A1 | 12/2002 | Kivisto et al. | |
| 2003/0012371 A1 | 1/2003 | Weinstock et al. | |
| 2003/0090464 A1 | 5/2003 | Lai et al. | |
| 2003/0095374 A1 | 5/2003 | Richardson | |
| 2003/0127345 A1 | 7/2003 | Zuleta et al. | |

FOREIGN PATENT DOCUMENTS

| | | | | |
|---|---|---|---|---|
| JP | 01193619 | * | 7/1989 | A45B 25/24 |
| JP | 10-192029 | | 8/2010 | |
| WO | WO 92/07372 | | 4/1992 | |

* cited by examiner

*Primary Examiner* — Quynh Nguyen
(74) *Attorney, Agent, or Firm* — Simpson & Simpson, PLLC

(57) ABSTRACT

The present invention discloses a protective instrument cover broadly comprising a continuous wall and having a closed distal end and an open proximal end. A sealing means is operatively attached to said continuous wall. In one embodiment, the continuous wall includes a reservoir that fits over a protruding knob to both cover the knob and allow hand operation of the knob. The present invention also comprises a combination of an instrument and a protective cover.

36 Claims, 15 Drawing Sheets

DISPOSABLE ANTIMICROBIAL COVERING FOR DEVICE

FIELD OF THE INVENTION

The present invention relates generally to protective coverings for devices, specifically to covers that are adapted to fit over different devices and prevent the spread of infection from infectious microbes located on a device to a device user.

BACKGROUND OF THE INVENTION

Hospitals and similar medical facilities, such as clinics, infirmaries and even occasionally private physician's offices, are notorious as sources of microbial infection. Despite the establishment of sterile fields in operating rooms and strict sanitation procedures throughout medical facilities, secondary infection of patients is endemic in medical facilities that manage and treat large numbers of patients.

Sources of infection in medical facilities can extend outside the typical treatment areas into patient care areas such as private and semi-private residential rooms, wards, and even lounges. These latter locations are typically furnished with convenience—oriented items such as telephones, bed controllers, and television remote control devices. These items are equipped with control knobs, push buttons, cords or cables, and orifices leading to earpieces and speakers to allow for telephone conversations and listening to televisions and radio broadcasts. Furthermore, these devices often have a multi-part body which is used to house electronic or other components. Consequently, the smooth contours of the bodies of these devices are marred by holes, grooves, niches, indentations, vents, and similar features that are usually small, narrow, and difficult to thoroughly clean.

In addition, cut backs in hospital funding often lead to reductions in staff, especially in maintenance and housekeeping personnel who are charged with sanitation and cleaning throughout a medical facility, including patient care areas. Such reductions in personnel mean that fewer people are available to do the same amount of work meaning that often noncritical areas may not be cleaned as carefully as necessary. As a result, microbes are allowed to flourish outside critical care areas leading to enhanced exposure of patient and staff to primary or secondary infection. Patients, who are often in a weakened condition when in a hospital type facility, are especially susceptible to these types of infections.

One method of reducing the probability of infection from these devices is to cover or wrap the devices with sanitary or sterile coverings to contain the microbes already present on or within a particular device and prevent them from contacting a patient or other person who may handle that device. One group of such "containment" coverings is designed for use in surgical procedures to preserve the sterile field in an operating room. Typical of this group is U.S. Pat. No. 5,812,188 issued in 1998 to Adair. The '188 patent discloses a sterile encapsulated endoscopic video monitor cover designed to provide a nonsterile cover for a endoscope video monitor to allow the monitor to be placed into a sterile field without introducing possible infectious microbes. The '188 device comprises a rigid or flexible enclosure that is either transparent or has a transparent window positioned over a video monitor. U.S. Pat. No. 5,792,045, issued in 1998 to Adair discloses a device configured to cover a nonsterile camera for use in the sterile environment in an operating room. U.S. Pat. No. 4,522,196, issued in 1985 to Cunningham, et al. discloses a sterile covering for a surgical camera comprising an annular ring attached to a containment cover that enables the attachment of a nonsterile camera to a sterile endoscope. U.S. Pat. No. 5,301,657, issued 1994 to Lafferty, et al. discloses a sleeve for maintaining sterility of a arthroscopic procedure by covering the cable of an endoscope cable extending from the sterile field to a nonsterile TV monitor. Similar to the '196 device, it comprises an annular ring that attaches the sleeve to the arthroscope. One drawback of these devices is that they generally lack the flexibility to be used with a variety of different devices. In addition, they do not enclose any part of any cords or cables that extend from the instrument out of the sterile field or any cable or cord outlets. Finally, these and similar devices often require a careful manipulation to attach and/or cover the nonsterile instrument or device which requires the use of trained personnel.

A second group of containment coverings includes covers that can be quickly placed over devices more typically used in every day situations. An example is found in United States Patent Application No. 2003/0012371 to Weinsock, et al. disclosing a cover for a telephone receiver. Although designed to enclose a phone, the '371 device comprises an open net type configuration over the ear and mouth microphones and an open area in the handle portion of the sock through which the phone is inserted. U.S. Pat. No. 4,939,778, issued in 1990 to Tomberlin, discloses a sleeve that encloses a telephone cord primarily designed to prevent the cord from becoming entangled with itself. U.S. Pat. No. 6,560,335, issued in 2003 to Zohn, et al. discloses a cover designed to fit over the earpiece and/or mouth piece of a telephone. In other embodiments, pieces can be formed from templates to enclose a phone or other device. These and similar devices posses the drawback of either not enclosing an entire device or, as in the case of some of the '335 embodiments, require adhesives and a significant amount of time to properly enclose the target device.

What is need then is protective covering that is quick and easy to use, disposable, does not require trained personnel to use, covers the part of a cord or cable extending from a device as well as the cord or cable outlet, and possesses the flexibility to be used with a variety of different devices.

SUMMARY OF THE INVENTION

The present invention broadly comprises a protective instrument cover comprising a tube having a continuous wall, an open proximal end, a closed distal end, and a sealing means operatively associated with the tube. In a second embodiment, the present invention broadly comprises a protective instrument cover having a tube including a continuous wall, an open proximal end, a closed distal end, a reservoir formed in the continuous wall, and a sealing means operatively associated with the tube.

An object of the invention is to provide a device cover that forms a barrier between infectious microbes and a patient or device user.

A second object of the invention is to provide a device cover that prevents infectious microbes from spreading from a device to a user such as a patient.

A third object of the invention is to provide a device cover that prevents infectious microbes from spreading from a patient to a device such as a telephone.

An additional object of the invention is to make available a device cover that is easy and simple to place over a device.

A second additional object of the invention is to supply a device that reduces the transmission of infectious microbes via device cords, such as telephone cords.

A further object of the invention is to provide a device cover that is easily cleaned.

A still further object of the invention is to make available a device cover that is disposable.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which.

DETAILED DESCRIPTION OF THE INVENTION

At the outset, it should be appreciated that like drawing numbers on different drawing views identify identical structural elements of the invention.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Figure 1:
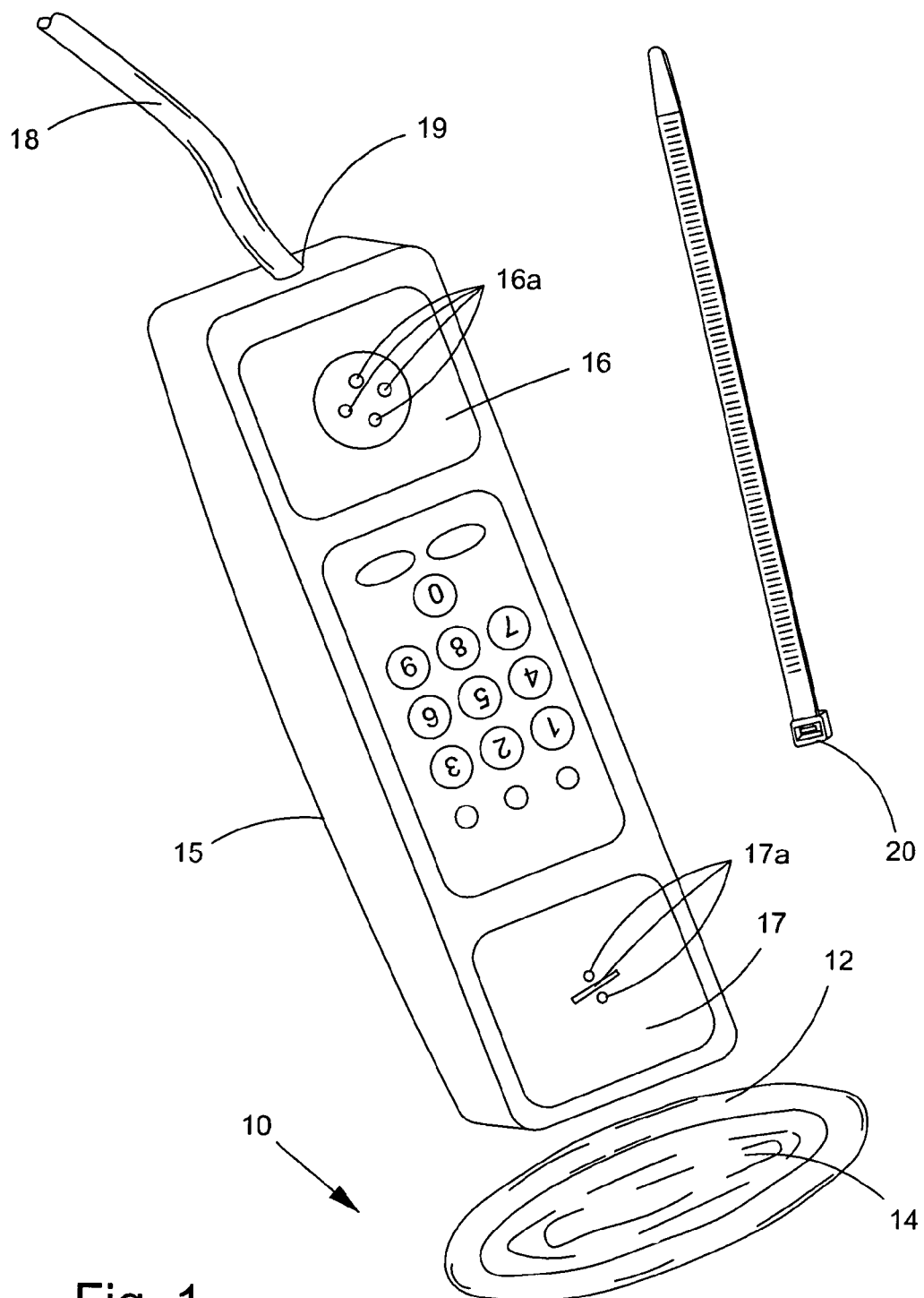
FIG. 1 is a top perspective view of the disposable cover of the present invention in a ready configuration.

Adverting to the drawings, FIG. 1 is a top perspective view of disposable cover 10 (cover 10) in a preferred ready configuration. Cover 10 can be used to cover various devices to prevent the spread of infection to and from a device or instrument to a user. Cover 10 is a tube having a continuous wall 12 and with an open proximal end 13 and a closed distal end 14. In one package form depicted in FIG. 1, wall 12 is rolled upon itself in an outward direction to produce a toroid shape with wall 12 surrounding distal end 14. In FIG. 1, device 15 is typical of instruments, implements, and other items that can be protected with cover 10. Examples of instruments or devices that can be protected by cover 10 include, but are not limited to, telephones, television remote controls, and hospital bed controllers. Device 15 can be seen comprising earpiece 17 and speaker 16. Speaker holes 16a and earpiece holes 17a, used to aid in sound transmission, and cord outlet 19 are typical of the type of crevice or cranny in which infectious microbes may be found. In addition, infectious microbes may be found in the interior of device 15. Cord 18 extends from cord outlet 19 on device 15. Cord 18 may be a telephone cord extending to a phone jack, a cable connected to a television from a remote controller, a power supply cord or other cord having a similar control- or power-supplying function. In one embodiment, pull tie 20 is provided to close cover 10 after it is placed over device 15. In an alternate package form, cover 10 may be folded for packaging into a box or carton from which it may be extracted and fitted over a device.

Figure 2:
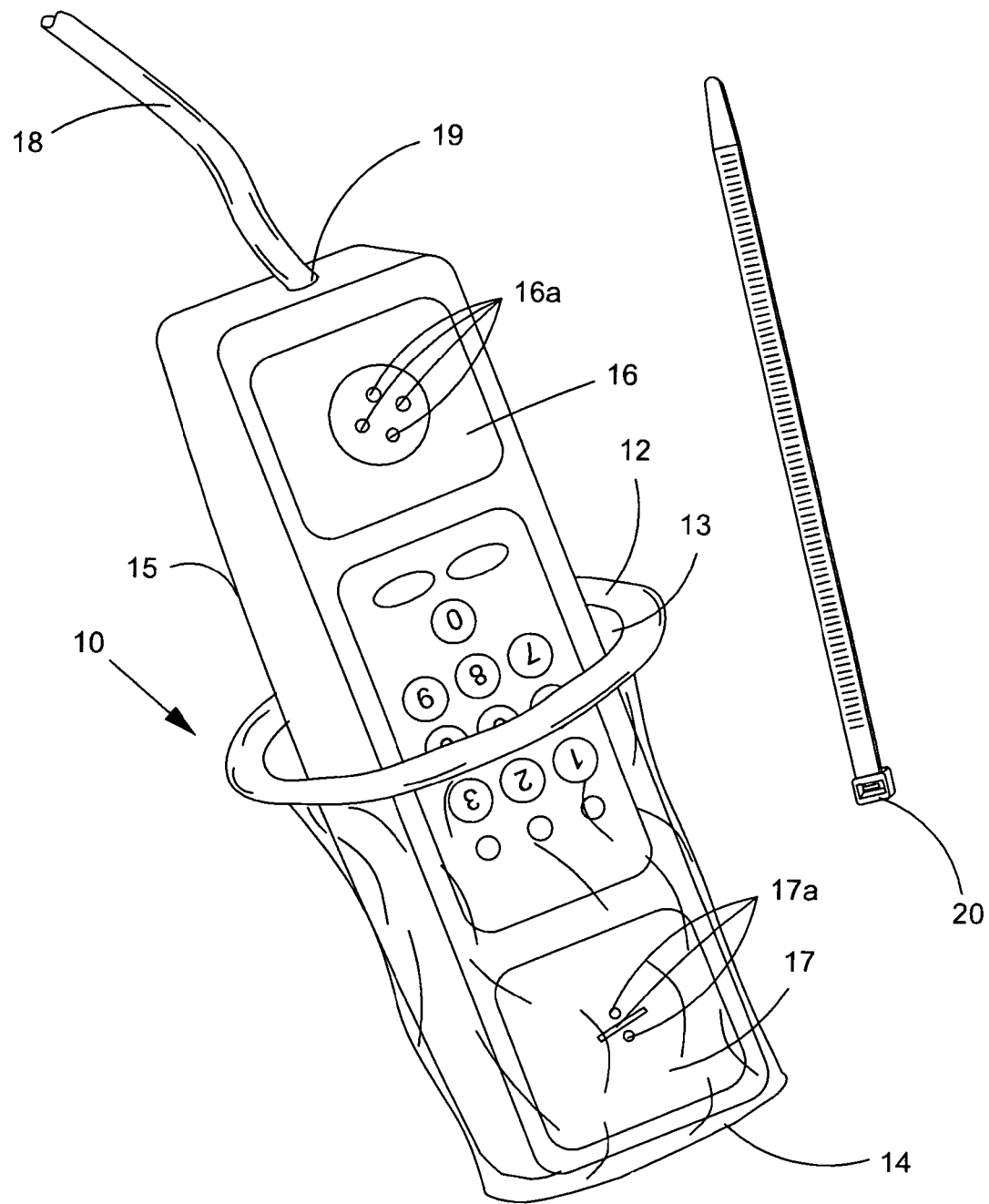
FIG. 2 is a top perspective view of the disposable cover of the present invention as it is being placed over a device.

FIG. 2 is a top perspective view of disposable cover 10 as it is being placed over device 15. As can be seen from FIG. 2, cover 10 is placed over device 15 such that distal end 14 is placed over the end proximate earpiece 17 opposite from cord 18. Continuous wall 12 is gradually unrolled to extend over the length of device 15. As wall 12 is extended, open proximate end 13 travels with the unrolled edge of wall 12.

Figure 3:
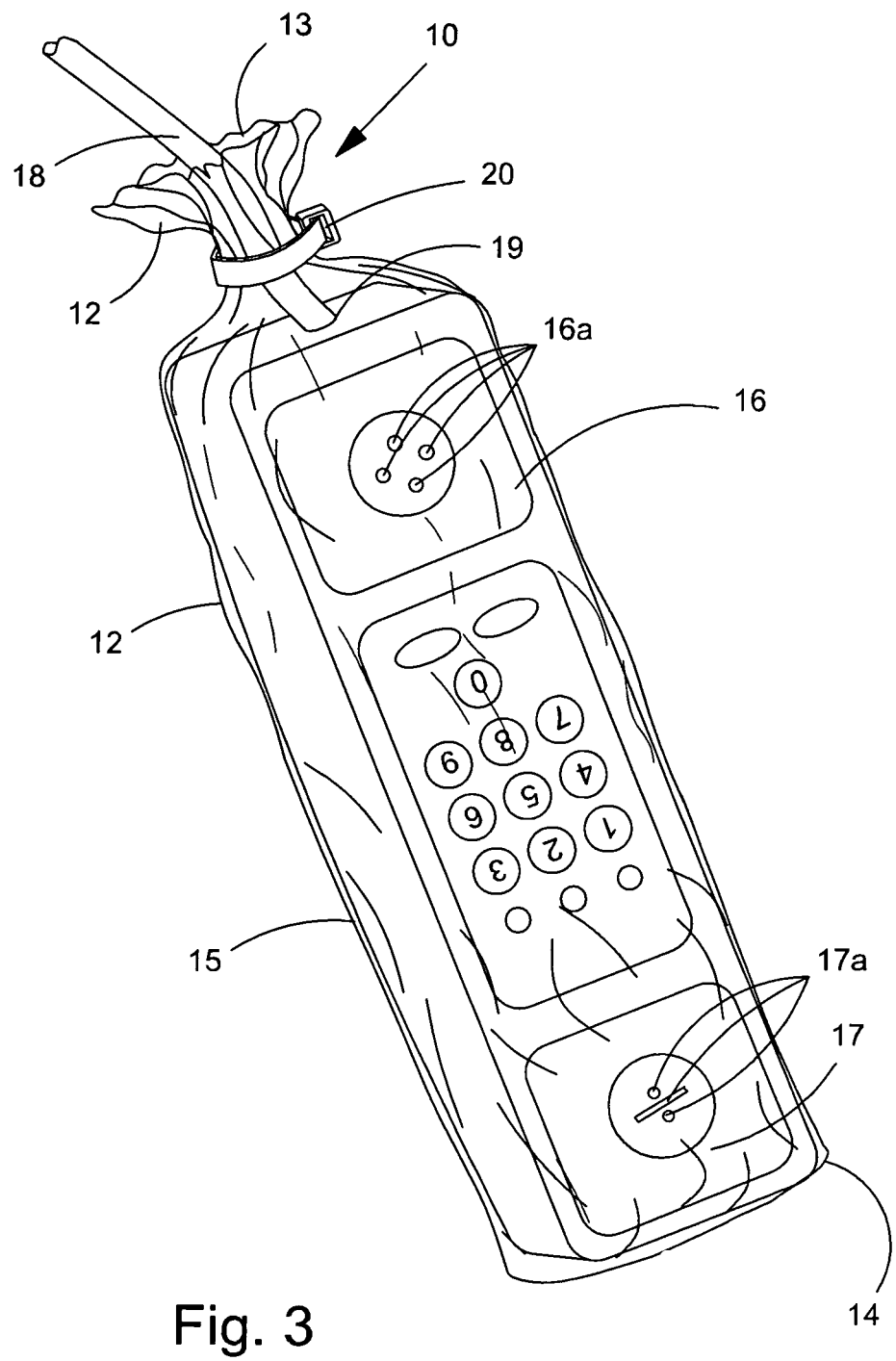
FIG. 3 is a top perspective view of the disposable cover of the present invention enclosing a device.

FIG. 3 is a top perspective view of cover 10 enclosing device 15. Pull tie 20 surrounds wall 12 of cover 10 near open proximal end 13 to enclose device 15 including part of cord 18 extending from cord outlet 19. By extending cover 10 over cord 18 as well as enclosing device 15, a user is protected from contact from pathogens located in or on device 10 as well as on cord 18 and/or in cord outlet 19 from which cord 18 extends.

Figure 4:
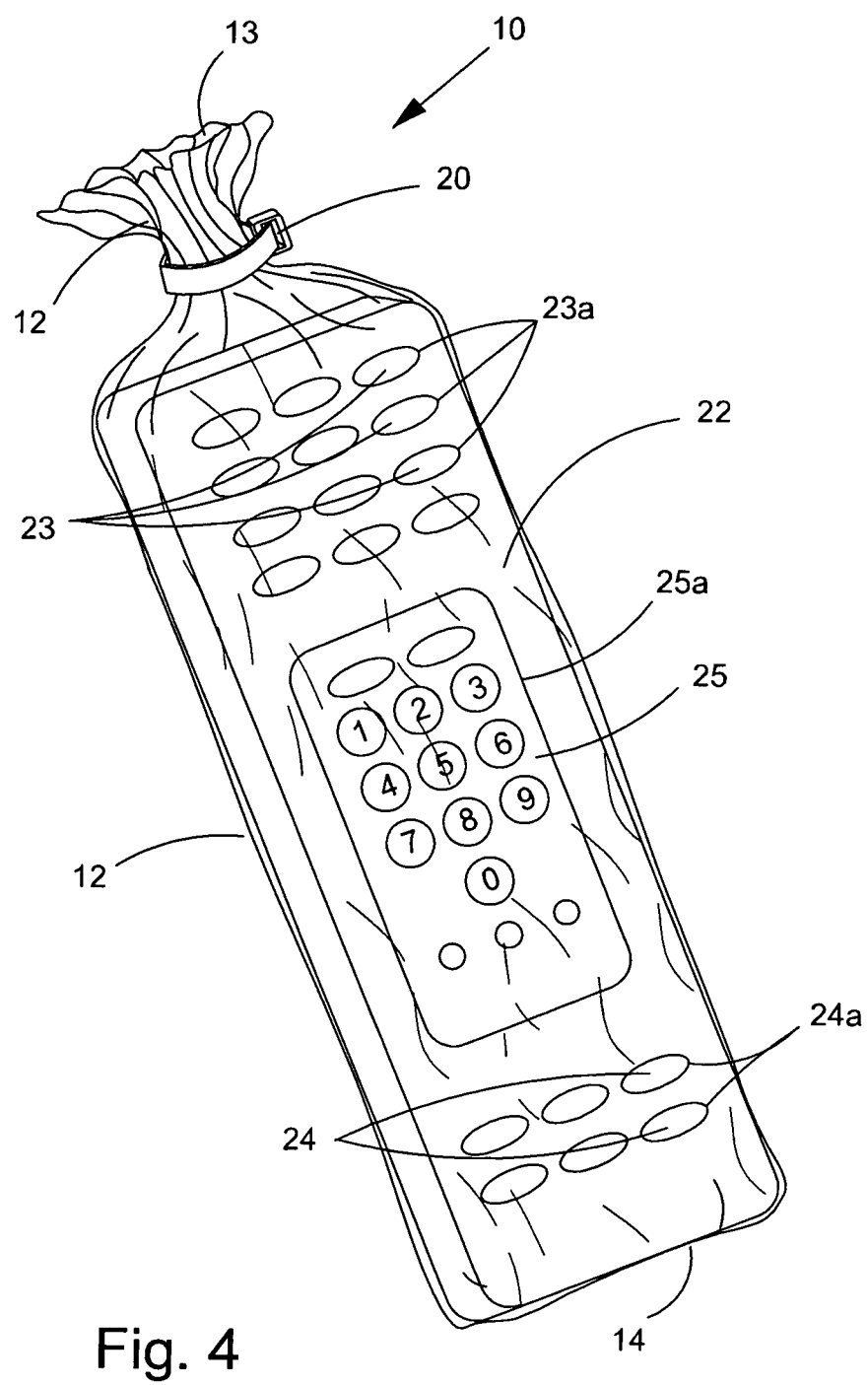
FIG. 4 is a top perspective view of the disposable cover of the present invention enclosing a cordless device.

FIG. 4 is a top perspective view of disposable cover 10 enclosing a device 22 in which pull tie 20 closes open proximal end 13 to create a substantially complete enclosure around device 22. Device 22 is depicted as a cordless device, such as a television remote control. Controls 23 and 24 and keypad 25 are shown as comprising crevices 23a, 24a, and 25a, respectively, all of which are typical microbial breeding areas that are difficult to access during cleaning to eliminate infectious microbes.

Figure 5:
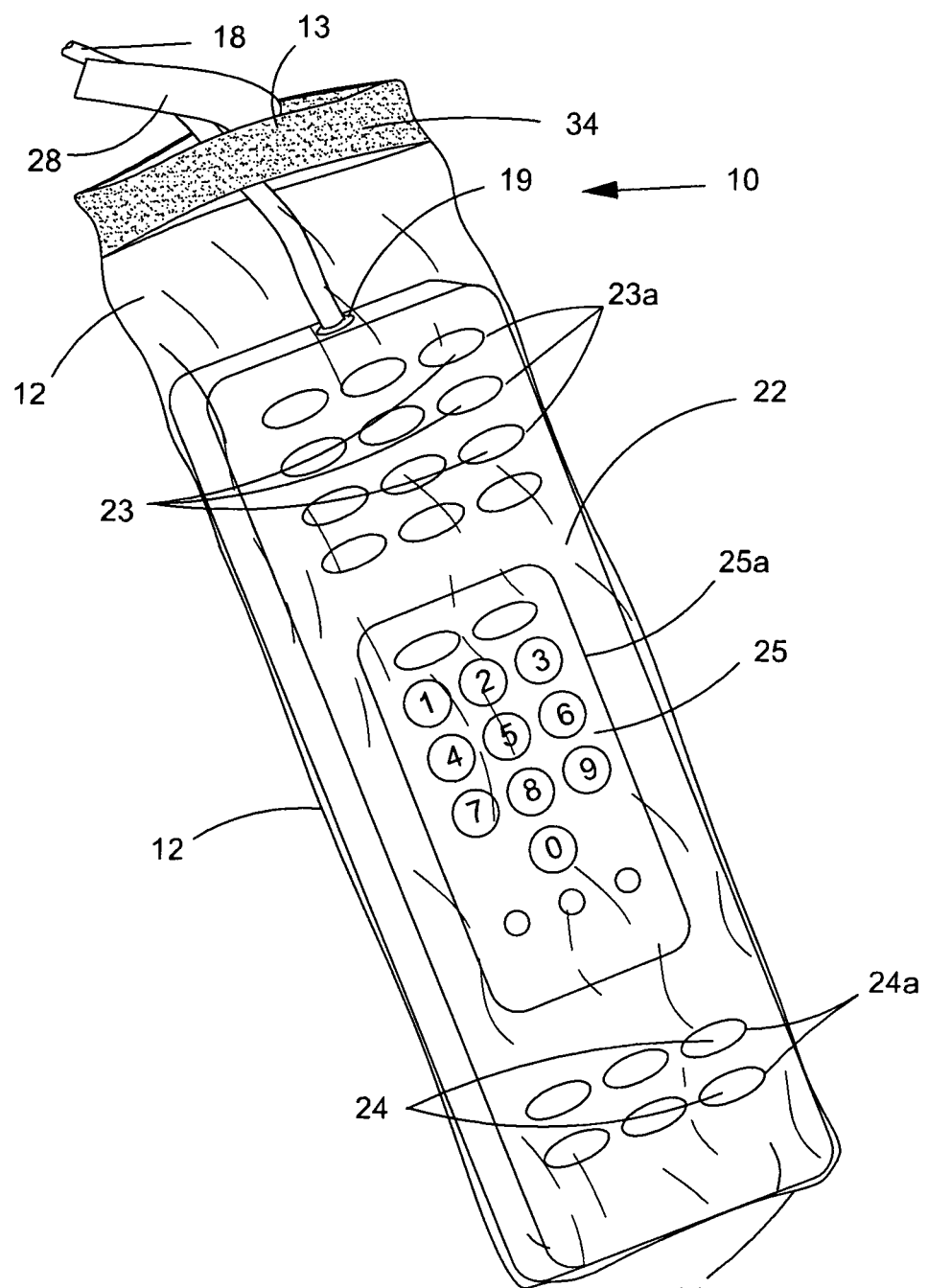
FIG. 5 is a top perspective view of the disposable cover of the present invention utilizing an alternate sealing system.
Figure 6:
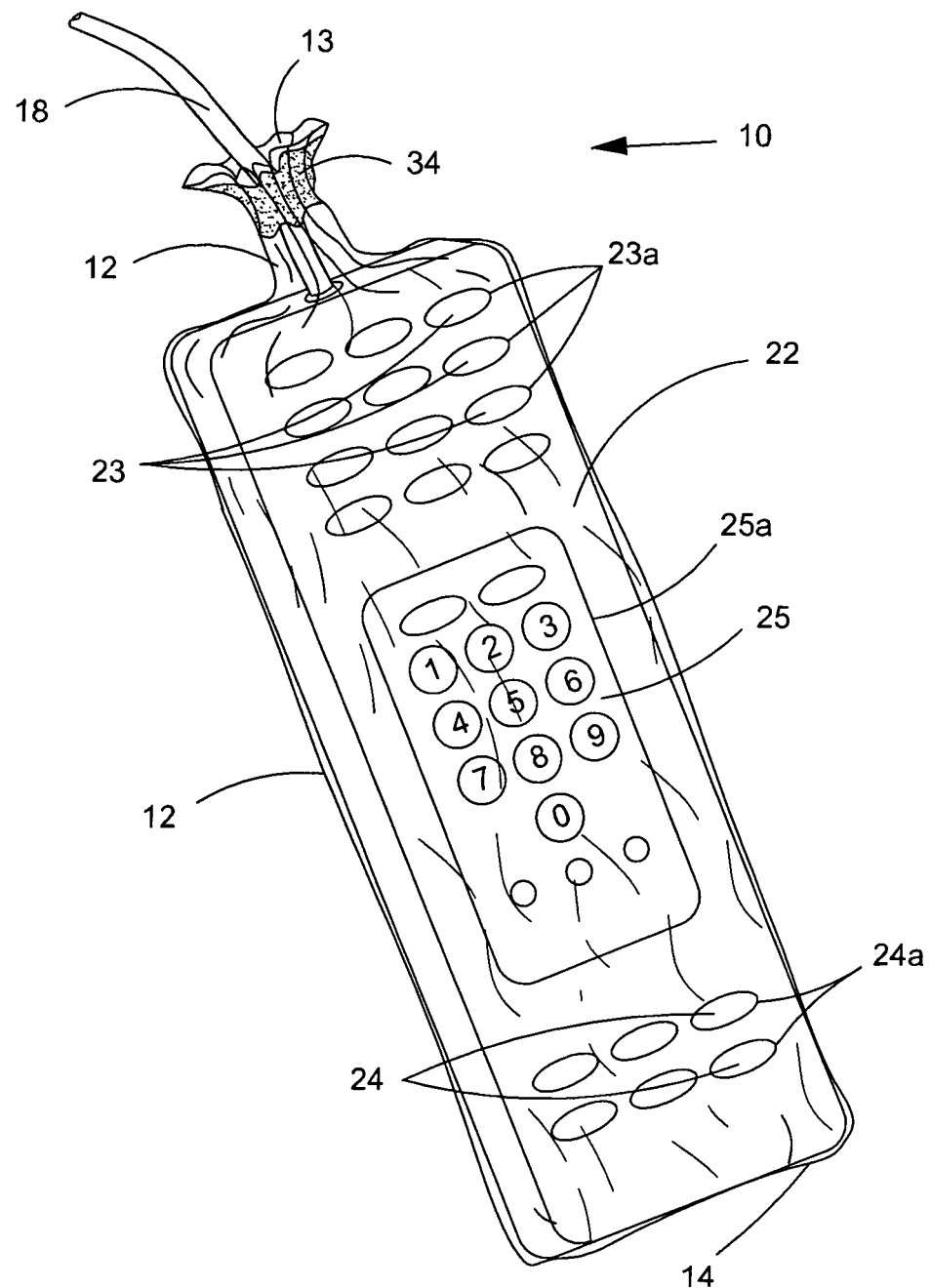
FIG. 6 is a top perspective view of the disposable cover of the instant invention depicting the closure of the alternate sealing system shown in FIG. 5.
Figure 6A:
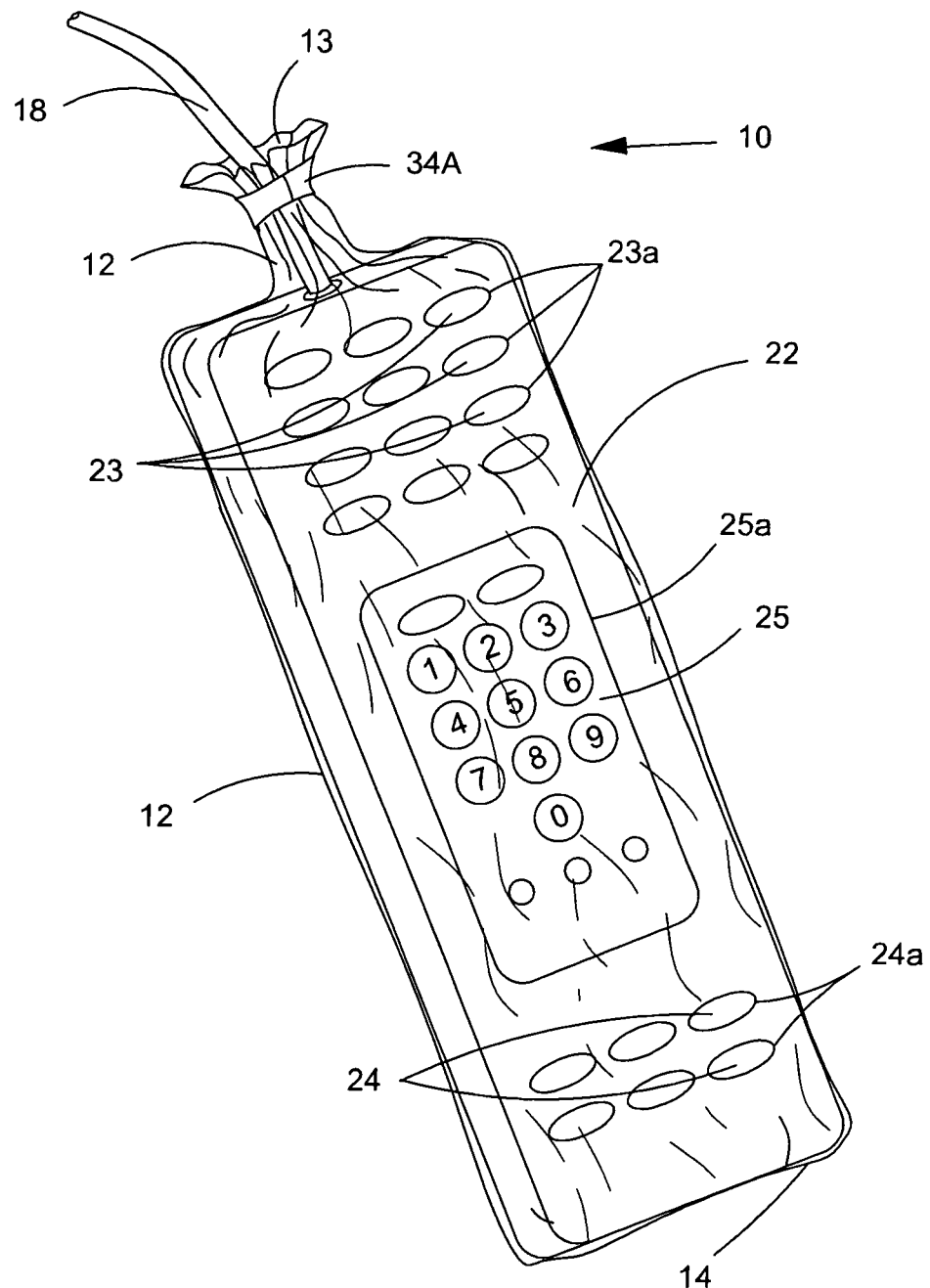
FIG. 6A depicts a second alternate sealing system utilizing tape.
Figure 6B:
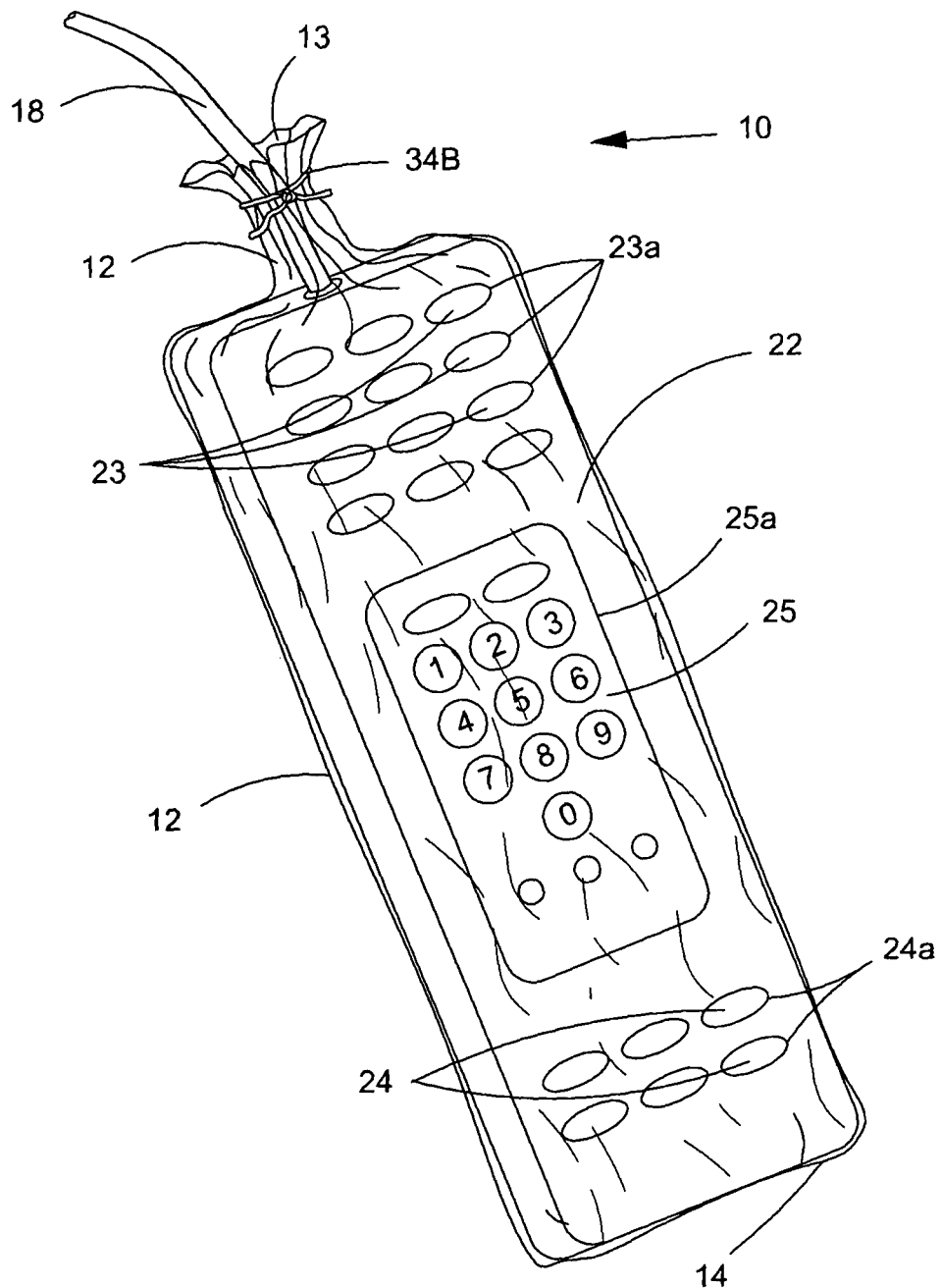
FIG. 6B depicts a third alternate sealing system utilizing string.
Figure 6C:
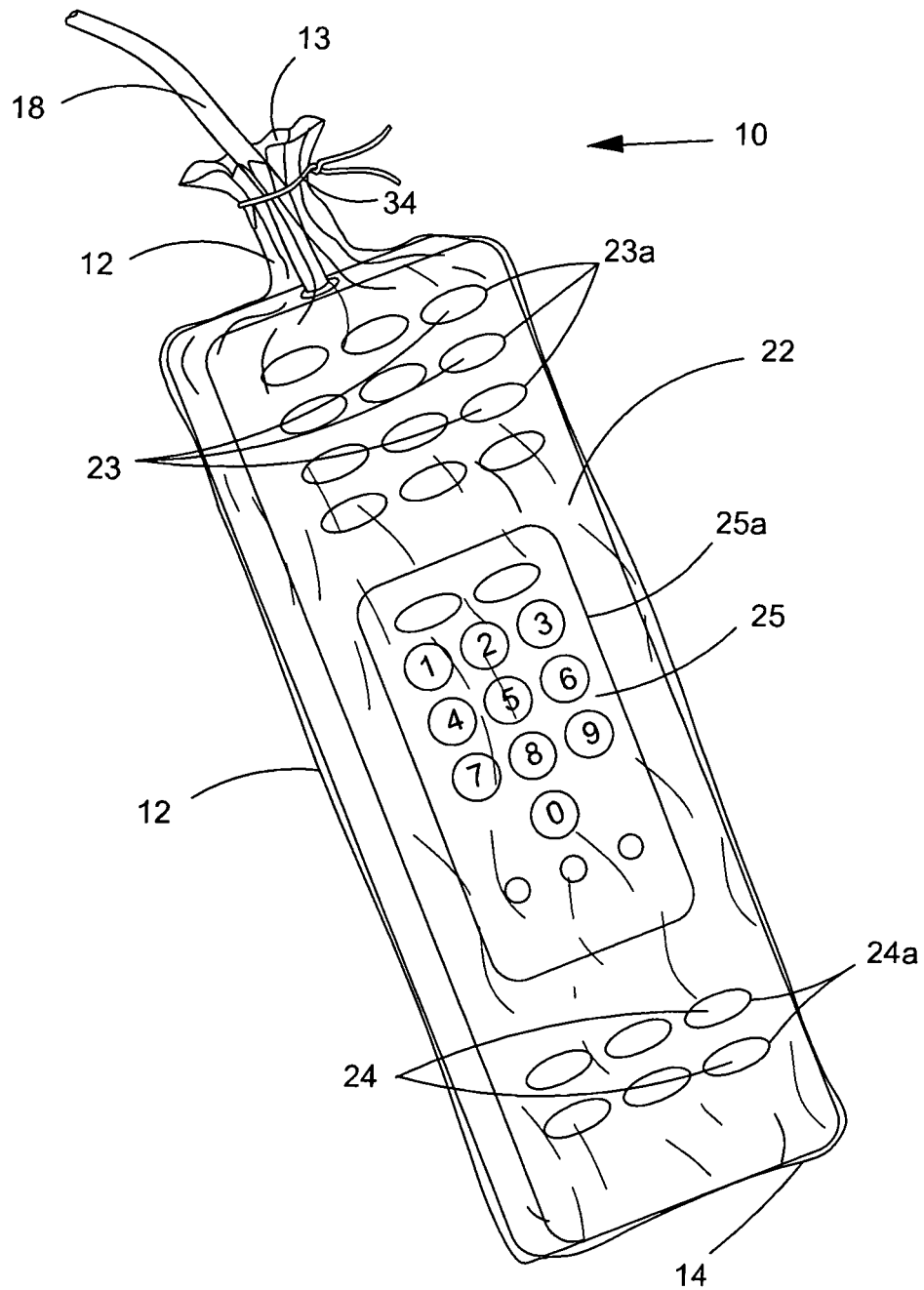
FIG. 6C depicts a further alternate sealing system utilizing a twist tie.

FIG. 5 is a top perspective view of disposable cover 10 utilizing a different sealing system 34. Device 18 is shown with cord 28 emerging from cord outlet 29. Adhesive band 34 is integral with cover 10 meaning that it is attached to or is incorporated into the structure of cover 10. In the embodiment shown in FIG. 4, adhesive band 34 is located around the periphery of open proximal end 13 through which cord 29 extends. In a preferred embodiment, sealing system 34 is covered by peel-off cover 28 to prevent the adhesive band 34 from becoming affixed to an object or to itself before it is needed by the user. In an alternate embodiment, seen in FIG. 6A, a tape 34A may be attached to wall 12 at or near open proximal end 13. In a second alternate embodiment, shown in FIG. 6B, a string 34B may be attached or integrated into cover 18 at or near open proximal end 13. In an additional alternate embodiment shown in FIG. 6C, twist tie 34C may be attached or integrated into cover 18 at or near open proximal end 13. Both the tape and string will have sufficient length to form a seal to close proximal end 13 as well as any cord that may be extending from device such as is seen in FIG. 5. FIG. 6 is the same top perspective view as shown in FIG. 5 depicting device 22 enclosed at proximal end 13 by forcing sealing system 34 on itself.

Figure 7:
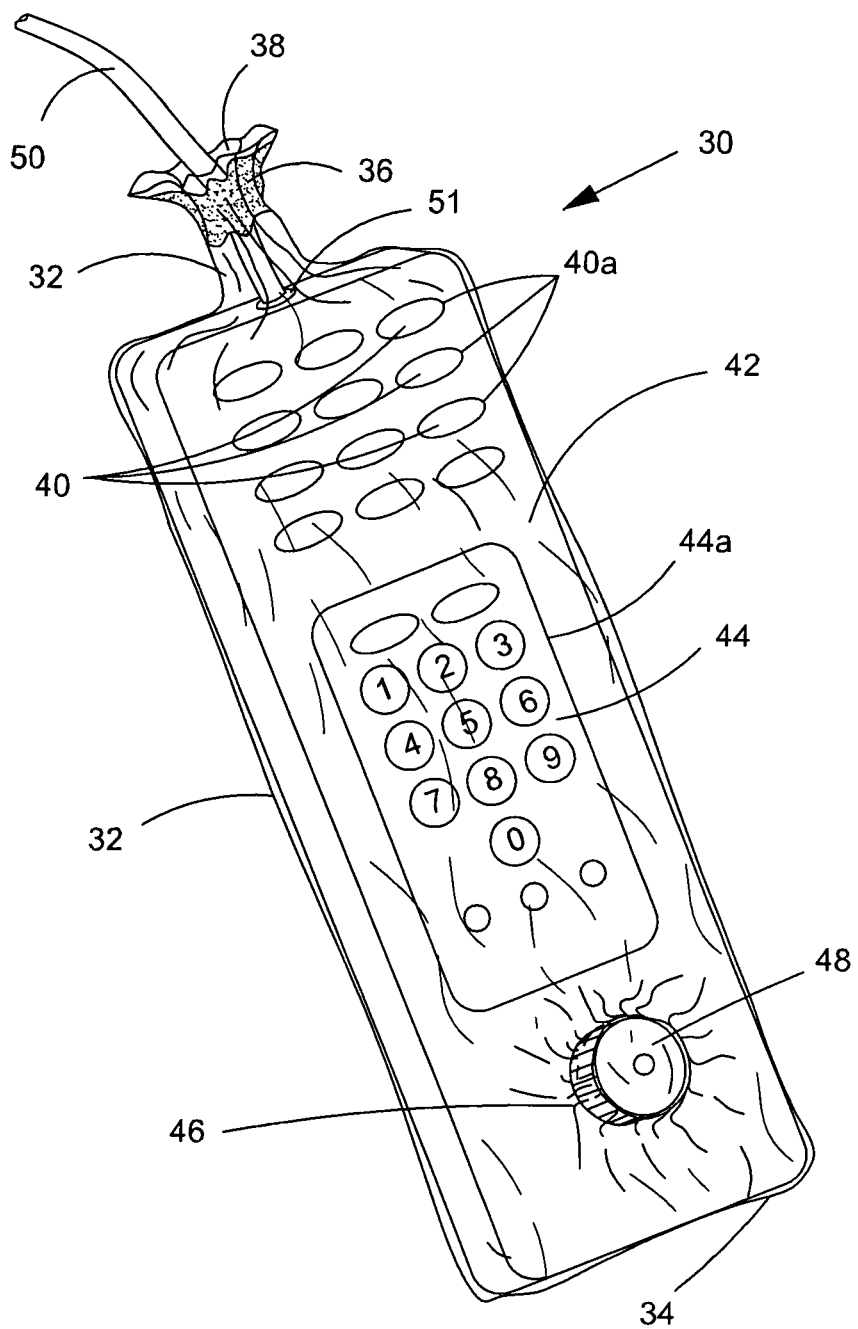
FIG. 7 is a top perspective view of the disposable cover of the instant invention demonstrating a reservoir incorporated into the continuous wall of the disposable cover to enclose a protrusion extending from top of the covered device.
Figure 8:
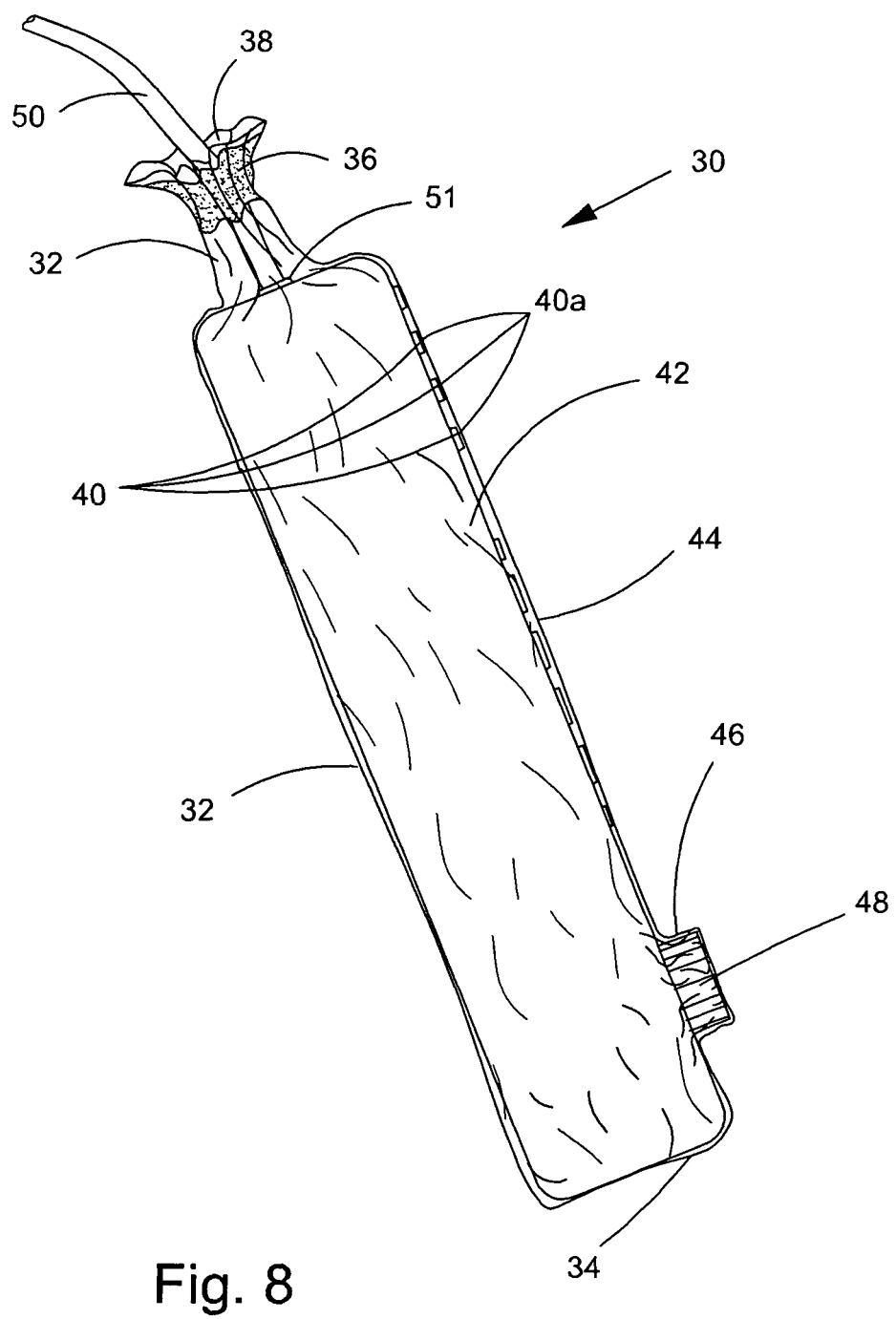
FIG. 8 is a side view of the reservoir shown in FIG. 7.

FIG. 7 is a top perspective view of an alternate embodiment of the instant invention in which disposable cover 30 incorporates reservoir 46 into continuous wall 32. Reservoir 46 is seen covering control 48, a control knob protruding from the top surface of device 42. The incorporation of reservoir 46 into continuous wall 32 allows for a sufficient volume of material to cover protruding control 48 without breaking the integrity of cover 30. In a preferred embodiment, reservoir 46 will be of sufficient size to allow the manipulation of control 48 without tearing, ripping or otherwise destroying the integrity of cover 30. FIG. 8 is side view of cover 30 seen in FIG. 7. Reservoir 48 is seen covering control 46. In addition, cover 30 is enclosing device 42 to prevent the transmission to the external environment of microbes that may be resident on or within device 42, including to any user of device 42.

Similarly, cover 30 prevents the transmission of infectious microbes from a user, such as a patient, to device 42, from which the microbes may be transmitted to a second user or other person such as cleaning or maintenance personnel. In particular, it can be seen that cord 50 and cord outlet 51, from which cord 50 extends, are enclosed by sealing system 38 to prevent transmission of microbes away from device 42 via cord 50.

Figure 9:
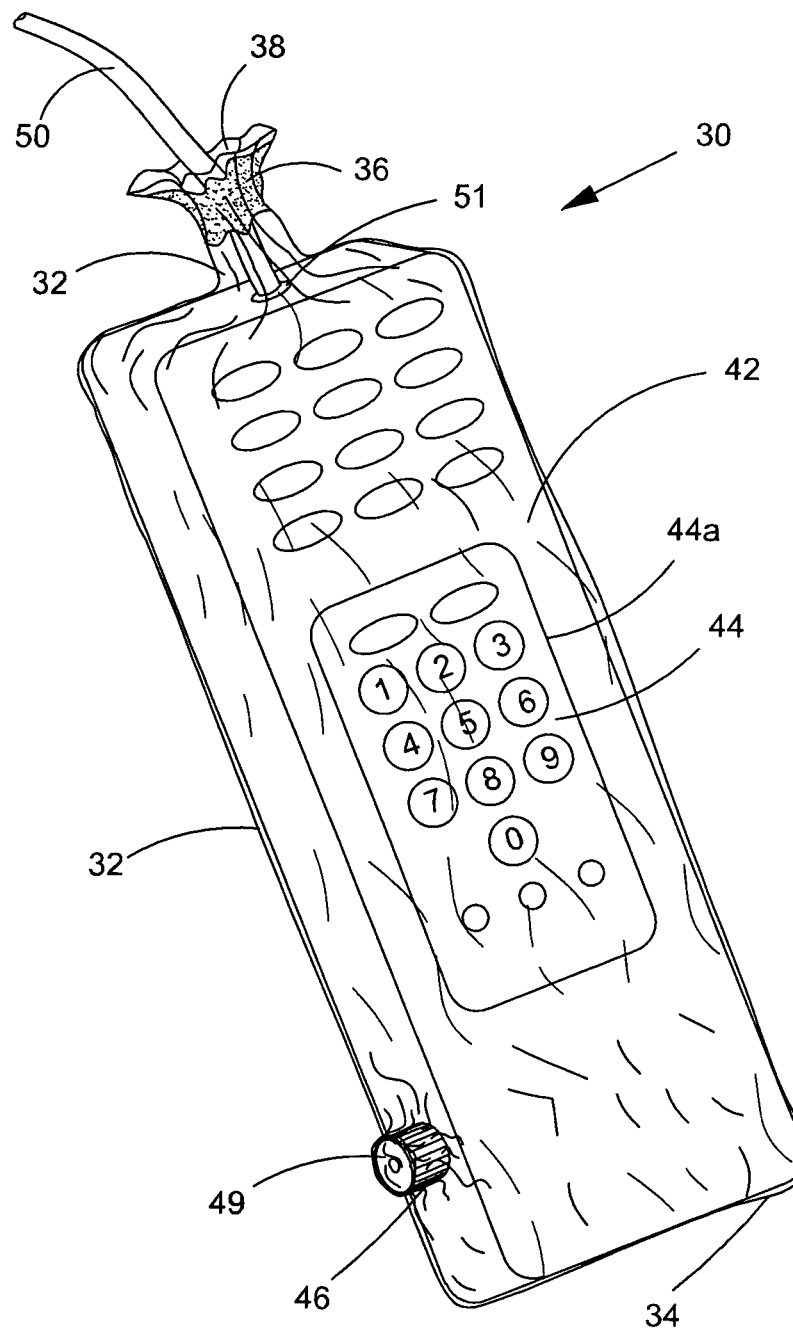
FIG. 9 is a top perspective view of the disposable cover of the instant invention demonstrating a reservoir incorporated into the continuous wall of the disposable cover to enclose a protrusion extending from the side of the device.
Figure 10:
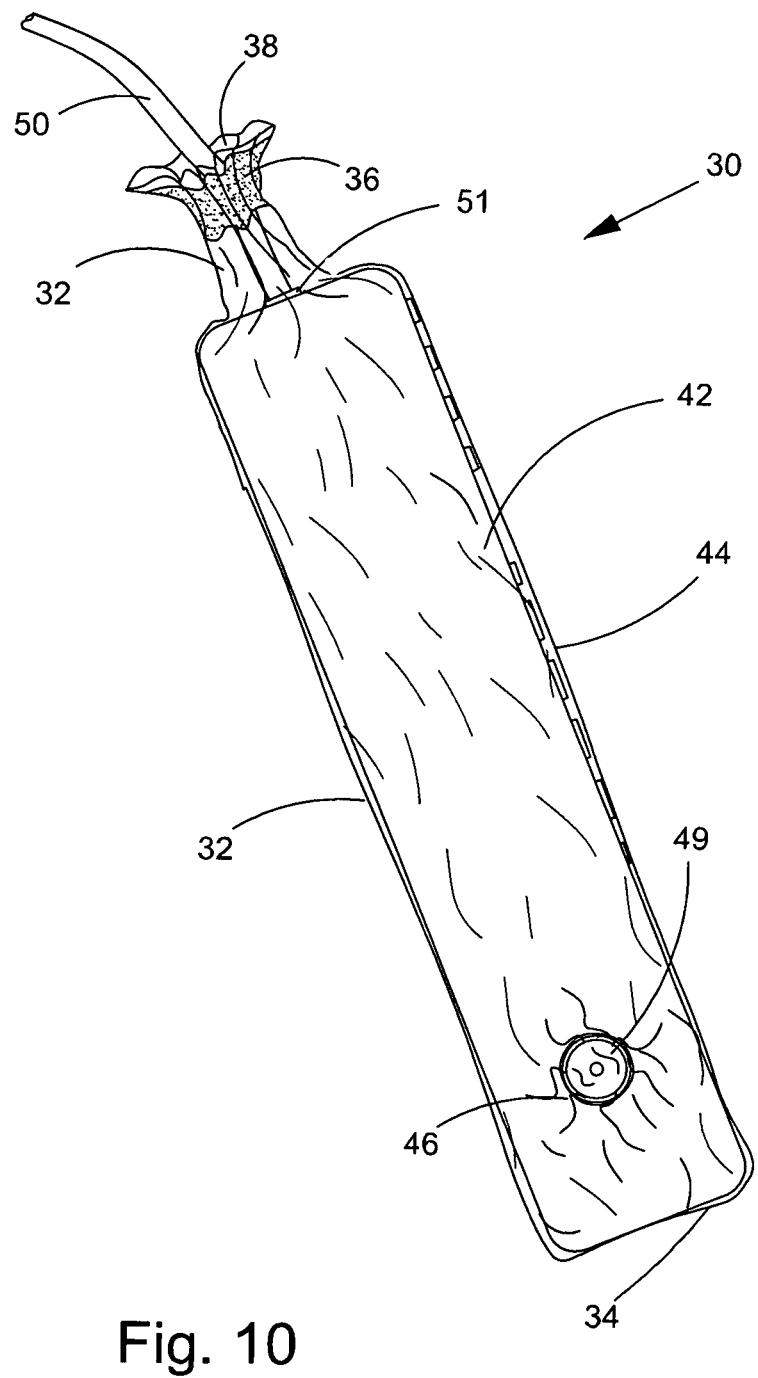
FIG. 10 is a side view of the reservoir shown in FIG. 9.

FIG. 9 depicts an alternate embodiment of cover 30 in which reservoir 46 is seen covering control 49 extending from the sidewall of device 42. Again, as discussed above, incorporation of reservoir 46 into continuous wall 32 allows for a sufficient volume of material to cover protruding control 49 without breaking the integrity of cover 30. FIG. 10 is a side view of cover 30 seen in FIG. 9. Reservoir 48 is seen covering control 49. In addition, cover 30 encloses device 42 to prevent the transmission to the external environment of microbes that may be resident on or within device 42, including any user of device 42. In particular, it can be seen that cord 50 and cord outlet 51, from which cord 50 extends, are enclosed to prevent transmission of microbes away from device 42 via cord 50. This closure is effected by sealing adhesive strip 36 around cord 50 in such a manner as to enclose cord outlet 51 and the portion of cord 50 proximate to cord outlet 51.

Figure 11:
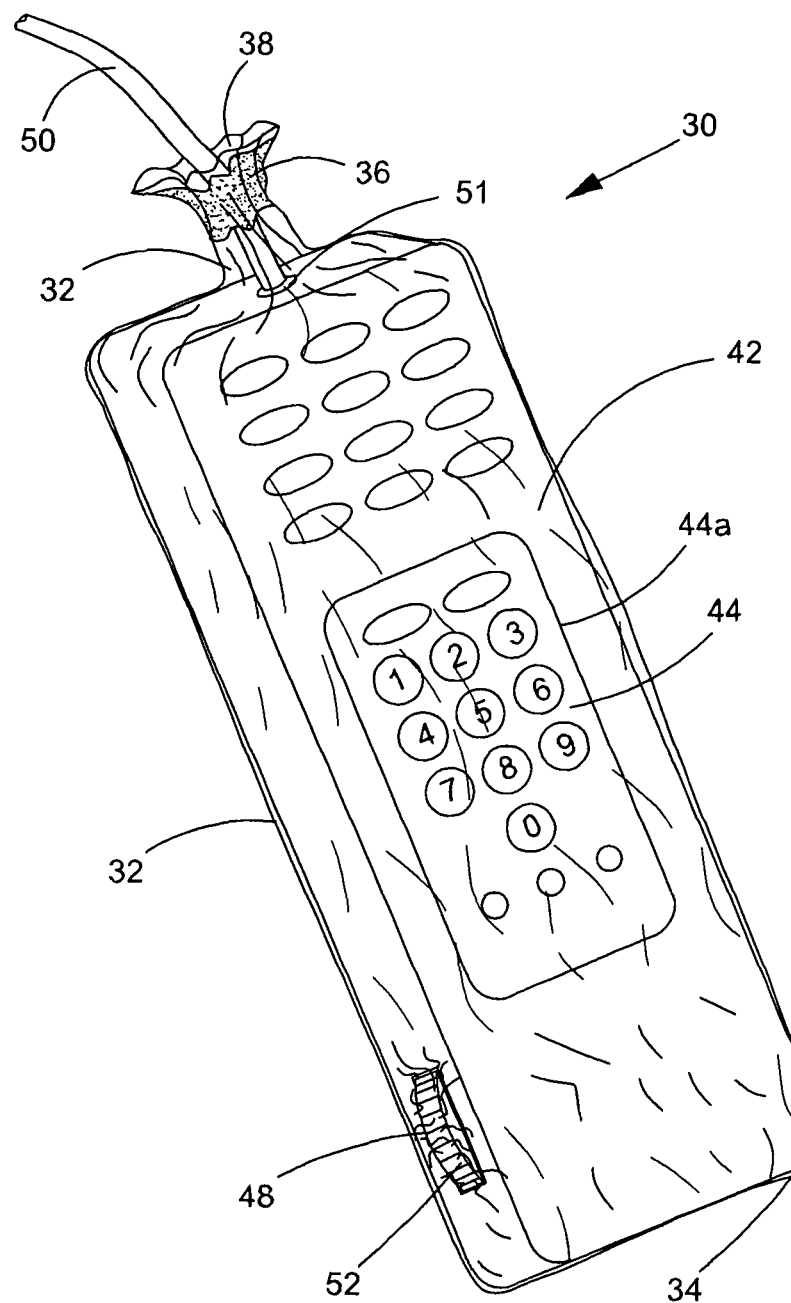
FIG. 11 is a top perspective view of the reservoir of the instant invention shown covering an alternate type of protrusion extending from the side of the device; and, FIG. 12 is a side view of the device and disposable cover shown in FIG. 11.
Figure 12:
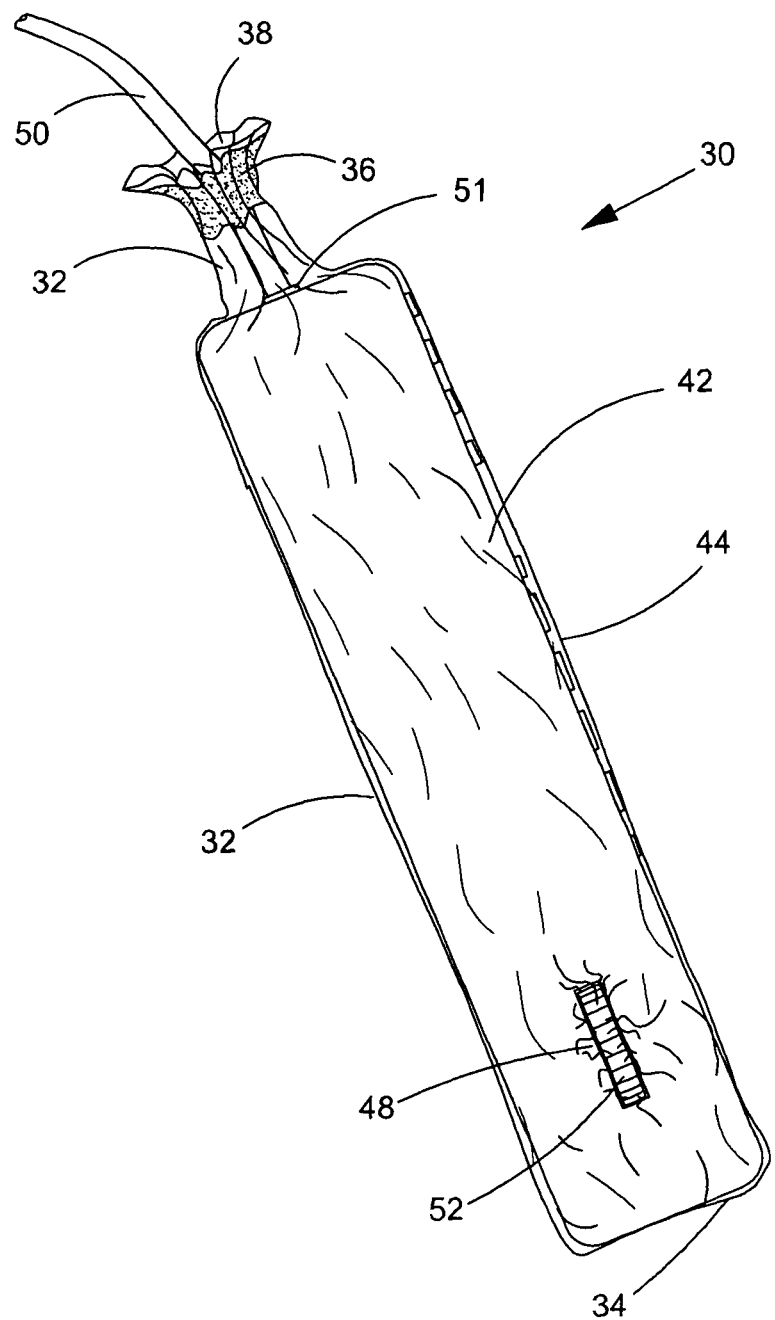

FIGS. 11 and 12 depict top perspective and side views, respectively, of cover 30 with continuous wall 32 incorporating reservoir 48 such that reservoir 48 encloses thumbwheel 52. Again, reservoir 48 is large enough to allow manipulation of thumbwheel 52 without breaking the integrity of reservoir 48.

Disposable cover 10 is preferably fabricated from elastomeric material that allows cover 10 fit over devices with varied types of configurations. Methods of making disposable cover 10 include, but are not limited to, dip molding in which a mold of cover 10 is dipped into a vat or container of the liquid elastomer and allowed to set into the final form. A second method is radio frequency sealing of seams in elastomeric material formed into a tube in which the radio frequency sealing creates a seamless continuous tube configuration.

A more preferred elastomeric material is polyurethane or other elastomer that is resistant to typical cleaning solvents and solutions used in a hospital or other medical facility setting. By using the method of unrolling wall 12 over a device, a user is able to fit cover 10 over a device quickly without the need for specific training.

Thus it is seen that the objects of the invention are efficiently obtained, although changes and modifications to the invention should be readily apparent to those having ordinary skill in the art, which changes would not depart from the spirit and scope of the invention as claimed.

We claim:

1. A protective instrument cover comprising:
   a tube, said tube including a seamless continuous wall and an open proximal end and a closed distal end; and,
   a sealing means operatively associated with said tube, said sealing means traversing the entire periphery of said open proximal end;
   wherein said seamless continuous wall completely covers said instrument;
   wherein said instrument comprises a cord and said instrument cover is configured such that said seamless continuous wall encloses at least partly the length of said cord extending from said instrument to form an enclosure around said cord;
   wherein said enclosure is sealed by said sealing means; and,
   wherein said continuous wall is configured as a toroid.
2. The protective instrument cover as recited in claim 1 wherein said sealing means is a tape.
3. The protective instrument cover as recited in claim 2 further comprising a cover placed over at least part of said tape.
4. The protective instrument cover as recited in claim 1 wherein said sealing means is a twist tie.
5. The protective instrument cover as recited in claim 1 wherein said sealing means is a pull tie.
6. The protective instrument cover as recited in claim 1 wherein said sealing means is a string.
7. The protective instrument cover as recited in claim 1 wherein said sealing means is integral with said continuous wall.
8. The protective instrument cover as recited in claim 7 wherein said sealing means is a tape.
9. The protective instrument cover as recited in claim 8 further comprising a cover placed over at least part of said tape.
10. The protective instrument cover as recited in claim 7 wherein said sealing means is a string.
11. The protective instrument cover as recited in claim 7 wherein said sealing means is an adhesive layer.
12. The protective instrument cover as recited in claim 11 further comprising a cover placed over at least part of said adhesive layer.
13. A protective instrument cover comprising:
   a tube including a seamless continuous wall and an open proximal end and a closed distal end;
   a reservoir formed in said continuous wall; and,
   a sealing means operatively associated with said tube, said sealing means traversing the entire periphery of said open proximal end;
   wherein said seamless continuous wall completely covers said instrument;
   wherein said instrument comprises a cord and said instrument cover is configured such that said seamless continuous wall encloses at least partly the length of said cord extending from said instrument to form an enclosure around said cord;
   wherein said enclosure is sealed by said sealing means; and,
   wherein said continuous wall is configured as a toroid.
14. The protective instrument cover as recited in claim 13 wherein said sealing means is a tape.
15. The protective instrument cover as recited in claim 14 further comprising a cover placed over at least part of said tape.
16. The protective instrument cover as recited in claim 13 wherein said sealing means is a twist tie.
17. The protective instrument cover as recited in claim 13 wherein said sealing means is a pull tie.
18. The protective instrument cover as recited in claim 13 wherein said sealing means is a string.

19. The protective instrument cover as recited in claim 13 wherein said sealing means is integral with said continuous wall.

20. The protective instrument cover as recited in claim 19 wherein said sealing means is a tape.

21. The protective instrument cover as recited in claim 20 further comprising a cover placed over at least part of said tape.

22. The protective instrument cover as recited in claim 19 wherein said sealing means is a string.

23. The protective instrument cover as recited in claim 19 wherein said sealing means is an adhesive layer.

24. The protective instrument cover as recited in claim 23 further comprising a cover placed over at least part of said adhesive layer.

25. In combination, an instrument and a protective instrument cover comprising:
   an instrument, said instrument having hand operated controls; and,
   a protective instrument cover, said protective instrument cover comprising a tube having a seamless continuous wall, an open proximal end, a closed distal end and a sealing means operatively associated with said tube, said sealing means traversing the entire periphery of said open proximal end;
   wherein said seamless continuous wall completely covers said instrument;
   wherein said instrument further comprises a cord extending from said instrument and wherein said seamless continuous wall at least partly encloses said cord to form an enclosure around said cord;
   wherein said enclosure is sealed by said sealing means; and
   wherein said continuous wall is configured as a toroid.

26. The combination instrument and protective instrument cover recited in claim 25 wherein said protective instrument cover further comprises a reservoir formed in said continuous wall.

27. The combination instrument and protective instrument cover recited in claim 25 wherein said sealing means is a tape.

28. The combination instrument and protective instrument cover as recited in claim 27 further comprising a cover placed at least partly over said tape.

29. The combination instrument and protective instrument cover recited in claim 25 wherein said sealing means is a twist tie.

30. The combination instrument and protective instrument cover recited in claim 25 wherein said sealing means is a pull tie.

31. The combination instrument and protective instrument cover recited in claim 25 wherein said sealing means is integral with said continuous wall.

32. The combination instrument and protective instrument cover recited in claim 31 wherein said sealing means is a tape.

33. The combination instrument and protective instrument cover as recited in claim 32 further comprising a cover placed at least partly over said tape.

34. The combination instrument and protective instrument cover recited in claim 31 wherein said sealing means is a string.

35. The combination instrument and protective instrument cover recited in claim 31 wherein said sealing means is an adhesive layer.

36. The combination instrument and protective instrument cover recited in claim 35 further comprising a cover placed over at least part of said adhesive layer.

* * * * *